United States Patent [19]

Ogiso et al.

[11] Patent Number: 4,552,671
[45] Date of Patent: Nov. 12, 1985

[54] SPIN FINISH COMPOSITIONS FOR POLYESTER AND POLYAMIDE YARNS

[75] Inventors: Osamu Ogiso; Hisao Yamamoto, both of Aichi; Akira Suzuki, Anjo, all of Japan

[73] Assignee: Takemoto Yushi Kabushiki Kaisha, Aichi, Japan

[21] Appl. No.: 661,147

[22] Filed: Oct. 15, 1984

[30] Foreign Application Priority Data

Jun. 4, 1984 [JP] Japan ................................ 59-69684

[51] Int. Cl.$^4$ ................... D06M 13/18; D06M 13/50; D06M 15/66
[52] U.S. Cl. ....................................... 252/8.9; 252/8.6; 556/437; 556/445; 568/613; 568/624
[58] Field of Search ............... 252/8.6, 174.15, 174.21, 252/8.9; 556/445, 437; 8/DIG. 1; 568/613, 624

[56] References Cited

U.S. PATENT DOCUMENTS

| | | | |
|---|---|---|---|
| 3,022,335 | 2/1962 | Lundsted | 568/624 |
| 3,101,374 | 8/1963 | Patton | 568/613 |
| 3,140,198 | 7/1964 | Dawson | 252/8.9 |
| 3,493,425 | 2/1970 | Campbell | 252/8.9 |
| 4,110,227 | 8/1978 | Dudley | 252/8.9 |
| 4,294,990 | 10/1981 | Kleber | 568/601 |
| 4,351,738 | 9/1982 | Takahashi | 252/8.75 |

FOREIGN PATENT DOCUMENTS

| | | |
|---|---|---|
| 50-59551 | 5/1975 | Japan . |
| 52-96297 | 8/1977 | Japan . |
| 55-137273 | 10/1980 | Japan . |
| 1189581 | 4/1970 | United Kingdom . |

Primary Examiner—Dennis L. Albrecht
Attorney, Agent, or Firm—Flehr, Hohbach, Test, Albritton & Herbert

[57] ABSTRACT

Spin finish compositions having as base oil polyether compounds which are ω-methoxy-poly (oxyethylene/oxypropylene) ether derivatives of a specified type and containing 0.05 to 10 weight % of polyalkylene oxide modified polysiloxane of another specified type are particularly desirable for application to polyester and polyamide yarns for ultra-high speed texturing because they have the characteristics of preventing fuzz on the yarns, thermally degraded substances and tacky white powder as well as reducing tackiness of such white powder.

1 Claim, No Drawings

SPIN FINISH COMPOSITIONS FOR POLYESTER AND POLYAMIDE YARNS

BACKGROUND OF THE INVENTION

This invention relates to spin finish compositions for polyester and polyamide yarns, and more particularly to lubricating agents which not only have the properties of reducing fuzz and filament breakage during ultra-high speed texturing of polyester and polyamide yarns and of reducing tackiness of the white powder produced by the false-twisting apparatus but also exhibit highly improved ability to reduce deposits on heaters which are used in the heating processes (hereinafter abbreviated as heater deposit resistance).

In the field of production and manufacturing of polyester and polyamide yarns, there have recently been improvements in productivity due to semi-automation and shortening of work processes. Production of partially oriented yarns (hereinafter abbreviated as POY) and successive or simultaneous draw-false twisting for the production of textured yarn are now being proposed. Faster execution of these processes is also being attempted and this trend is presently growing at a fast rate.

When the speed of these processes is increased, problems and difficulties of new kinds frequently arise and wholly new requirements must be considered for the spin finish to be used in such processes.

Firstly, since the yarn speed increases and so does the contact pressure of the yarns which run against various machine parts such as rollers, guides, heaters and disks, this tends to increase the rate of generating fuzz as well as yarn breakage. For this reason, lubricating agents must now be able to provide higher levels of lubricity and cohesion to feed yarns for false twisting and in particular to those for draw-false twisting.

Secondly, since the yarns run against all kinds of machine parts at high speeds and under high pressures, polymers are physically scraped off and they may accumulate on the friction disks, presenting a significant difficulty from the point of view of work process. Moreover, the tacky white powder thus generated on the friction disks become adhered to the interlacer used for the interlace process on textured yarns. In order to eliminate troubles of this kind, such powder must be prevented from falling off, or the lubricating agent must be such that powder generated would not be sticky.

Thirdly, if there is an increase in the amount of yarns passing through a heater per unit time for heat treatment or in the rotational speed of the yarns, the centrifugal force of the motion will also increase and this will cause all kinds of materials to fall off and scatter around. Since the heaters for heat treatments must be made longer and their surface temperatures raised so that sufficient heat can be supplied to the filaments for setting crimps, this tends to accelerate the thermal degradation of the materials that fall off. If such thermally degraded components (such as tar) accumulate on the surfaces of these heaters, there arise ill effects such as fuzz, breakage of filaments and spotty crimps. For this reason, there now is a great need for lubricants which are capable of preventing materials from falling off and are superior in heater deposit resistance.

Lubricating agents containing various compounds have already been proposed for application in the spinning process so that the subsequent false twisting process can be executed smoothly. As explained above, however, it is found impossible with the conventional lubricants to adequately satisfy the conditions for false twisting which are steadily becoming severer. What is actually being done is, for example, to stop the operation of apparatus now and then so that the surfaces of the heaters can be cleaned. This not only causes a loss in thermal efficiency but also is a backward move away from automation because manpower must be expended for the cleaning work, resulting in reduction in production efficiency. Now that the speed of false twisting process is increasing rapidly, it is indispensable that the lubricant used for this process should stringently satisfy the overall requirements regarding lubricity, cohesion of yarn, non-tackiness of the materials that fall off in the process and antistatic capability.

For improving the heat resistance of a feed yarn in heat treatment processes, it used to be considered important to improve the heat resistance of the lubricant itself and studies have been made of various lubricants which would not themselves undergo thermal degradation or deposit on the heaters. Examples of such lubricants are shown below, but they are unsatisfactory for one reason or another.

Regarding lubricating agents which are to serve as the principal component, mineral oils and esters of aliphatic acids are not desirable from the points of view of fuming characteristics and generation of tar. Esters with quaternary carbon introduced into their molecules (Japanese Patent Tokukai No. Sho 50-53695) and esters of polyoxyalkylenated bisphenol and aliphatic acid (Japanese Patent Tokko No. Sho 53-43239) are fairly resistant against oxidation but since they lack the ability to completely prevent the generation of tar, tar will eventually accumulate as time goes on. Polydimethylsiloxane and its end modified products generate static electricity significantly and lack scouring ability and compatibility with other components of the lubricants (Japanese Patent Tokko No. Sho 58-12391, Tokukai No. Sho 55-67075). As for modified silicones such as methylphenyl polysiloxane and polyepoxysiloxane, they themselves generate insoluble, thermally degraded sludge on the surfaces of the heaters if too much of them (in excess of 10 weight %) is used as components of a lubricant (Japanese Patent Tokukai No. Sho 49-30621 and Tokukai No. Sho 51-67415). Even with polyether-type compounds which are considered to be the most useful lubricating agents among known compounds (Japanese Patent Tokukai No. Sho 56-31077), the problem of heater deposit occurs as explained above under the severe conditions related to the increase in the rate of false twisting process. It has also been pointed out that the rate of deposit may increase even more, depending on the type and amount of emulsifier or anti-static agent added to them. As for the use of $\omega$-alkoxy-poly (oxyalkylene) ether derivatives substituting the end hydroxyl group by alkoxy group, etc., (Tokukai No. Sho 54-134198, German Patent No. 1594906), they are too low in molecular weight (less than 1000 with all examples) so that the lubricating agent will fly off the yarns rapidly, causing the amount of oily smoke and tar to increase in the heaters and increasing fuzz and yarn breakage due to insufficient lubrication.

As for constituents other than lubricating agents, addition of a small amount of antioxidant can produce some favorable effects (Japanese Patent Tokko No. Sho 48-17517 and Tokukai No. Sho 53-19500) but it is not suitable under conditions of a high-speed texturing process. Examples whereby a small amount of polydimethylsiloxane, methylphenyl polysiloxane or polyepoxysiloxane (less than about 10 weight %) is added do not show reduction in the rate of generation of tar (Japanese Patent Tokko No. Sho 54-5040 and Tokukai No. Sho 55-137273) and they are generally water-insoluble (even if a large amount is used). Moreover, since these compounds should be emulsified in water as components of the lubricant, the added emulsifier itself will tend to become a source of heater deposit.

As for components other than lubricating agents such as polyalkylene oxide modified polysiloxane, polyethylene oxide modified polysiloxane does not have sufficient heater deposit resistance as a lubricant for feed yarns for high-speed false twisting because the modifying group consists only of an oxyethylene group (Japanese Patent Tokko No. Sho 44-27518). As for the use of a polyether compound in combination with linear organic polysiloxane with kinetic viscosity in excess of 15cst (Japanese Patent Tokukai No. Sho 48-5309), heater deposit resistance has been found to be too small in the case, for example, of methyl (polyethylene oxide)polysiloxane. As for the use of a large amount (over 35 weight %) of polyalkylene oxide modified silicone in combination with polyalkylene oxide with affinity (Japanese Patent Tokukai No. Sho 50-59551), the idea is to reduce the amount of substances dropping from filaments of modified silicone onto the heaters so that an improvement would be made regarding the generation of white sludge on heaters but since, as described above, an increased speed of false twisting or draw-false twisting results in an increase in the centrifugal force on the yarns, it is extremely difficult by a physical means to prevent the lubricant constituents from becoming squeezed out and let fly off the fiber surfaces. As for the method of using polyalkylene oxide modified polysiloxane in combination with a reactive silicone compound in the ratio (former/latter) of 5 to 400/100 in weight (Japanese Patent Tokukai No. Sho 52-96297), modified polysiloxane itself generates a thermally degraded insoluble sludge on the heater surfaces if it is used as component of the lubricant.

SUMMARY OF THE INVENTION

It is therefore an object of the present invention to provide spin finish compositions which can satisfy the aforementioned three requirements and overcome the difficulties encountered by the conventional types of spin finish, or such compositions which can become a lubricating agent themselves or a principal component of a lubricating agent.

This invention is based on the following discoveries made by the present inventors:

(1) Modified polyether derivatives of a special type obtained by introducing neo-paraffinic structure into the middle section of ω-methoxy-poly(oxyalkylene)ether can be used as a lubricating agent for base oil because they can extremely effectively reduce fuzz and yarn breakage which tend to increase in ultra-high speed texturing of polyester and polyamide yarns.

(2) Compounds obtained by methoxylation of the end hydroxyl group of polyoxyalkylene ethers with molecular weight within a certain range can be used as a lubricating agent for base oil because they can prevent generation of tacky white powder very effectively in ultra-high speed texturing of polyester and polyamide yarns.

(3) A relatively large portion of the thermally degraded substances deposited on the heaters in ultra-high speed texturing of polyester and polyamide yarns comes not only from the lubricating agent but also from the polymers and oligomers from the yarns. If, in view of this observation, a special polyether type of lubricant is used as base oil in accordance with (1) and (2) above, and if a prescribed small amount of polyalkylene oxide modified polysiloxane of a particular kind limited by molecular structure and molecular weight is added to it, the amount of aforementioned heater sludge can be reduced significantly.

DETAILED DESCRIPTION OF THE INVENTION

This invention relates to compositions which are to be used in ultra-high speed texturing of polyester and polyamide yarns and characterized in that generation of fuzz in the textured yarns, yarn breakage during the process, generation of tacky white powder and accumulation of thermally degraded substances on the heaters are all reduced. In particular, such compositions are applied to polyester or polyamide yarns used for ultra-high speed texturing with yarn speed no less than 600 m/min. They use as base oil a polyether compound which is an ω-methoxy-poly(oxyethylene/oxypropylene)ether derivative synthesized from alcohol shown by

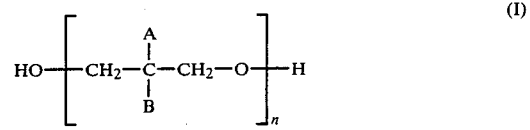

where A and B are independently alkyl group with 1 to 4 carbon atoms or hydroxymethyl group and n is 1 or 2, ethylene oxide, 1,2-propylene oxide and a methylator, having average molecular weight of 1500 to 6000 and the ratio oxyethylene/oxypropylene of 5–50/95–50 (average weight ratio) and containing 0.05 to 10 weight % of polyalkylene oxide modified polysiloxane of average molecular weight 2500 or greater shown by

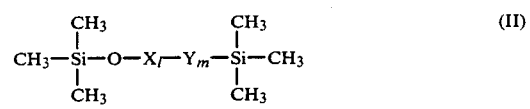

where X is

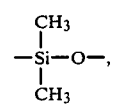

l is an integer 20 to 100, Y is

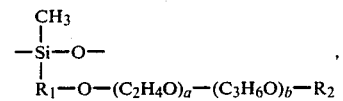

m is an integer 1 to 9, $R_1$ is alkylene group with 3 to 4 carbon atoms, $R_2$ is hydrogen, alkyl group with 1 to 8 carbon atoms or acyl group with 2 to 8 carbon atoms, a and b are integers satisfying $15 \leq a+b \leq 80$ and $2/8 \leq b/a \leq 8/2$, and the polydimethyl siloxane part shown by X and the polyalkylene oxide modified siloxane part shown by Y as well as the polyethylene oxide part with subscript a and the polypropylene oxide part with subscript b may be repeated either by block or random repetition.

According to the present invention, ω-methoxy-poly(oxyethylene/oxypropylene)ether derivative (hereinafter abbreviated as Component (A)) reduces fuzz and yarn breakage in ultra-high speed texturing of polyester and polyamide yarns and not only suppresses the generation of white powder at the disk but also significantly reduces tackiness of the generated white powder. Moreover, it cooperates with polyalkylene oxide modified polysiloxane shown by aforementioned formula (II) to prevent the generation of heater tar. This may be because its methoxylation reduces the hydrogen bonds (between the components of the lubricating agent or between a component of the lubricating agent and microparticles of polymers and oligomers) due to the hydroxyl group at the end of the molecule or also because of the increase in heat resistance due to neo-structure carbon. If it is an alkyl group with 2 or more carbon atoms that substitute the hydroxyl group at the end of the molecule, sufficiently high reaction yields (rate of end capping) as expected of this invention cannot be obtained. As the number of carbon atoms is increased, water solubility becomes significantly affected and the amount of generated heater tar increases. As for the effects of the average molecular weight of Component A, the amount of generated heater tar becomes large if the average molecular weight is less than 1500 while the reduction in tackiness of white powder becomes small if the average molecular weight exceeds 6000. When obtaining Component A, the average weight ratio of ethylene oxide (hereinafter abbreviated as EO) and 1,2-propylene oxide (hereinafter abbreviated as PO) to be added to the alcohol shown by formula (I) should be EO/PO=5-50/95-50. Too much EO causes the heater deposit to increase while too much PO lowers stability when it is actually used.

According to the present invention, furthermore, a small amount of polyalkylene oxide modified polysiloxane (hereinafter abbreviated as Component (B) is added as an indispensable constituent but the following 5 conditions must be satisfied:

(1) Molecular weight must be no less than 2500;
(2) Number of repetitions of X(l) must be 20 to 100;
(3) Number of repetitions of Y(m) must be 1 to 9;
(4) The alkylene oxide chain in Y is a (block or random) repetition of EO and PO; and
(5) Number of EO repetitions a and that of PO repetitions b must satisfy the conditions $15 \leq a+b \leq 80$ and $2/8 \leq b/a \leq 8/2$.

It is only compounds of formula (II) of particularly modified type that exhibit the desired effects, that is, a particularly significant heater deposit resistance. The objectives of the present invention cannot be achieved fully if any of the conditions mentioned above is not satisfied. If the molecular weight is less than 2500, for example, the effect is diminished probably because the compound itself cannot withstand the severe conditions of heat treatment in the false twisting process, smoking or evaporating off and thus failing to form a stable oil membrane. If m is greater than 10 or l is less than 19, its properties come to resemble those of polyether so that the amount of oligomers falling off from the traveling filaments increases and the effects obtainable in such a situation would be no different from if this compound were not added at all. If l exceeds 100, not only does heater deposit resistance become weaker but it itself begins to form a varnish-like substance probably because its properties approach those of polydimethyl siloxane. If a and b fail to satisfy the aforementioned conditions, satisfactory results cannot be obtained probably because stable and uniform oil membranes are not formed on the fiber surfaces due either to its own properties or to the lowering of its compatibility with the other components of the lubricating agent.

Component A of this invention does not contain a hydroxyl group in its molecule and can be synthesized by successive random or block addition polymerization of EO and PO to alcohols shown by aforementioned formula (I) at 100°–120° C. under a high pressure condition in the presence of an alkaline catalyst (such as KOH), followed by reaction with a methylator. Alcohols shown by formula (I) in this case include 2,2-di(hydroxymethyl)heptane, 2,2-di(hydroxymethyl)pentane, 1,1,1-trimethylol propane, 1,1,1-trimethylol ethane, pentaerythritol, dipentaerythritol, etc. while the methylator can be methyl chloride, methyl bromide, methyl iodide, dimethyl sulfate, etc.

As for Component B shown by formula (II), it can be synthesized easily, for example, by the hydrosilylation method between compounds of groups (i) and (ii) below:

(i) Compounds obtainable by alkyl etherification of the end hydroxyl groups of EO and PO addition compounds of allyl alcohol;

(ii) Methyl hydrogen polysiloxane having random or block positioned hydrogen atoms

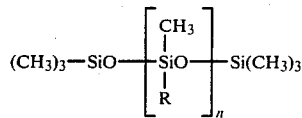

where Rs are a random or block positioned mixture of CH3 and H.

The compositions of this invention use aforementioned Component A as base oil and contain aforementioned Component B by 0.05 to 10 weight %. They can either serve as a lubricating agent themselves or become the principal constituent of a lubricating agent. If Component B is contained by less than 0.05 weight %, its effects cannot be exhibited satisfactorily in these situations and there will result an increase in the amounts of heater deposits and of oligomer and polymer scum generated from the yarn as well as degraded substances thereof. If it exceeds 10 weight %, on the other hand, it would generate a thermally degraded insoluble sludge, becoming itself a cause of heater deposit.

When a compound according to the present invention is actually used as a lubricating agent, it may contain in appropriate proportions in addition to aforementioned Components A and B an antistatic agent, an emulsifier, a wetting agent, an anti-moulding agent, an anti-rusting agent and also a lubricant like polyether derivatives of end hydroxyl type which has been proposed. In particular, those containing 0.1 to 5 weight % of an appropriate surface active agent of various types as antistatic agent are found effective. Surface active agents include anionic, cationic, amphoteric and aminoxide types. They all serve to suppress electrostatic charge generated on the traveling yarns and to cause the generated charge to leak away swiftly. One or more of them may be used at the same time. Examples of anionic surface active agents are salts of alkali metals and organic amines such as alkan sulfonate and alkylbenzene sulfonate as examples of sulfonates, salts of alkali metals and organic amines such as higher alcohol sulfate and polyoxyalkylene alkylether sulfate as examples of sulfates, salts of alkali metals and organic amines such as phosphates of various natural and synthetic (both first and second class) alcohols and their addition products with alkylene oxide as examples of phosphates, and aliphatic monocarboxylates and dicarboxylates as examples of carboxylates. Of these, salts of sodium, potassium or alkanolamine having alkyl group or alkenyl group with 8 to 18 carbon atoms within their molecule as lipophilic group are preferable. Among cationic surface active agents, the alkyl quaternary ammonium type is preferable. As for amphoteric surface active agents, there are alkylbetaine, alkyl imidazolinium betaine, etc. As for surface active agents of aminoxide type, there are alkyl dimethylamine oxide, alkyl dihydroxyethyl aminoxide, etc.

The compositions of the present invention exhibit synergistic effects of aforementioned Components A and B when they are used as spin finish (either by themselves or as a principal constituent of a lubricating agent) for polyester or polyamide yarns provided for ultra-high speed texturing with yarn speed no less than 600 m/min. In the actual use, they may be applied to fibers either as an aqueous emulsion, a solution with an organic solvent or by themselves (neat oiling). The amount of lubricating agent deposited on yarns should generally be 0.2 to 1.0 weight % and preferably 0.25 to 0.6 weight % with respect to the yarn. The effects of the present invention are particularly noteworthy if a lubricating agent of the present invention is applied at the rate of 0.25 to 0.6 weight % as effective component to POY which is being wound up at the speed of 2000 to 6000 m/min and is subsequently subjected to false twisting or draw-false twist texturing.

In short, compositions according to the present invention use Component A as base oil and contain Component B by 0.05 to 10 weight %, and if use is made of a lubricating agent made entirely of such a composition or containing it as principal constituent, superior overall stability in high speed manufacturing not obtainable with the conventional lubricating agents and, in particular, reduction in fuzz and filament or yarn breakage, elimination of tackiness from the white powder and an increase in heater deposit resistance can be obtained as a result of the synergistic effect of the components based on their unique molecular structures and the range of their molecular weights.

In what follows, test and comparison experiments will be described for more clearly explaining the present invention but they are not intended to limit the scope of the present invention. In the following, compositions of lubricating agents will be expressed in units of weight % unless specifically noted to be otherwise.

TEST EXPERIMENTS NOS. 1 TO 7 AND COMPARISON EXPERIMENTS NOS. 1 TO 14

Lubricating agents for test experiments Nos. 1 to 7 and those for comparison experiments Nos. 1 to 14 shown in Table 1 were individually prepared. POY was produced by using each of these lubricating agents and, in all cases, by the following method, and such POY was used for draw-false twist texturing. Evaluation was made for each POY regarding the following four points: static charge on sliding yarn, fuzz on yarn, heater deposit and tackiness of white powder deposited on the friction disk. The results of evaluation are shown also in Table 1, which demonstrates that the superior characteristics of the compositions of the present invention are clearly demonstrated.

(i) Production of POY

Immediately after melt spinning of polyethylene terephthalate, a 10%-emulsion of lubricating agent was applied to the yarn by the kiss-roll method and a 12 kg cake of 115-denier, 36-filament POY was obtained by winding at the rate of 3300 m/min. The amount of lubricating agent deposited on POY was 0.35 to 0.45 weight %.

(ii) Draw-false twist texturing

Twisting system=Three-axis friction spindle (with solid ceramic disk); Speed of yarn=650 m/min; Draw ratio=1.518; Heater on twisting side=2.5 m in length with surface temperature of 210° C.; Heater on untwisting side=None; Intended number of twisting=3200 T/m.

(iii) Evaluation of fuzz (shown in the Tables as "Fuzz")

Appearance of fuzz was examined by observation on the surface of the cheese (2 kg roll) of false twisted yarn and the results were evaluated according to the following standards:
O: No fuzz
Δ: One or two pieces of fuzz
X: Three or more pieces of fuzz (iv) Evaluation of heater deposit (shown in the Tables as "Heater")

After a continuous operation for 2 days under the aforementioned conditions of draw-false twist texturing, a magnifier was used to examine by observation whether or not tar, scum, sludge, etc. had been generated in the yarn path on the heater on the twisting side. Evaluation was made according to the following standards:
O: Hardy any heater deposit
Δ: A small amount of heater deposit
X: Heater deposit observed (v) Tackiness of white powder (shown in the Tables as "Powder")

After a continuous operation for 2 hours under the aforementioned conditions of draw-false twist texturing, white powder which became adhered to the friction disk was gathered and a predetermined amount thereof was placed between the two slide glass pieces of a microscope. These upper and lower glass pieces were then slidingly moved with respect to each other in horizontal circles to determine whether or not spherical bodies would be formed and, if they were, their diameter was measured. The results were evaluated according to the following standards:
O: No spherical bodies were formed
Δ: Diameter less than 1 mm
X: Diameter 1 mm or greater
Tackiness of white powder is proportional to the diameter of the spherical bodies thus formed.

(vi) Evaluation of static charge on the yarn (shown in the Tables as "Charge")

Electrostatic voltage of the yarn was measured by a static electrometer (made by Kasuga Denki Kabushiki Kaisha) immediately after its passing through the twisting spindle and the delivery rollers. The results were evaluated according to the following standards:

O: Voltage 0 to 300 V
Δ: Voltage 301 to 1000 V
X: Voltage greater than 1000 V

In Table 1,
(A-1) is ..-methoxy polyether (Component A of this invention)

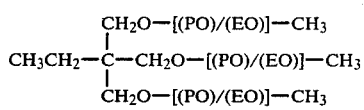

with PO/EO=75/25 (weight ratio), by random addition, molecular weight (hereinafter abbreviated as MW)=2000;

(B-1) is polyalkylene oxide modified polysiloxane (Component B of this invention)

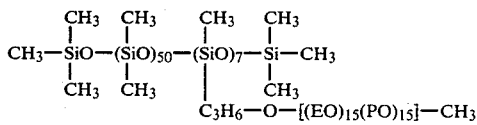

where the repetition of the polydimethyl siloxane part and the polyalkylene oxide modified siloxane part and that of EO and PO are both random repetitions;

(A'-1) is ω-methoxy polyether

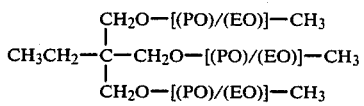

with PO/EO=75/25, by random addition, and MW=7000;

(A'-2) is ω-methoxy polyether, similar to (A'-1) in structural formula, with PO/EO=75/25, by random addition, and MW=1000;

(A'-3) is ω-methoxy polyether, similar to (A'-1) in structural formula, with PO/EO=40/60, by random addition, and MW=2000;

(A'-4) is ω-hydroxy polyether

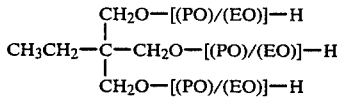

with PO/EO=70/30, by random addition, MW=5000;

(A'-5) is ω-hydroxy polyether

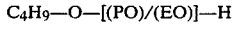

with PO/EO=50/50, by random addition, and MW=10000;

(B'-1) is polydimethyl siloxane with viscosity 360 cst at 30° C.;

(B'-2) is methylphenyl polysiloxane containing 45 mole % of phenyl and with viscosity 450 cst at 30° C.;

(B'-3) is polyepoxy siloxane with 1 weight % epoxified and with viscosity 6000 cst at 30° C.;

(B'-4) is amino modified silicone containing 10 mole % of amino group and with viscosity 1000 cst at 30° C.;

(B'-5) is polydimethyl siloxane derivative

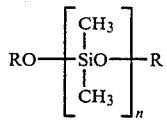

where R consists of 14 mole % of trimethylsilyl and 86 mole % of hydrogen and n=13.8; and (C-1) is alkan sulfonate soldium salt where alkan=-mixture having 12 to 16 carbon atoms.

TEST EXPERIMENTS NOS. 8 TO 13 AND COMPARISON EXPERIMENTS NOS. 15 TO 24

Lubricating agents for test experiments Nos. 8 to 13 and those for comparison experiments Nos. 15 to 24 shown in Table 2 were individually prepared. POY was produced by using each of these lubricating agents and, in all cases, by the following method, and such POY was used for draw-false twist texturing. Evaluation was made for each POY regarding the following five points: static charge on sliding yarn, fuzz on yarn, heater deposit, amount of polyester oligomers in heater deposit ("Oligomer" in Table 2, in units of weight %) and tackiness of white powder. The results are shown also in Table 2, which demonstrates that the superior characteristics of the compositions of the present invention are clearly exhibited. The heater deposit was collected and quantitatively analyzed by separation of constituents and infrared absorption spectrum as well as by the measurements of melting points (similarly for oligomers for Table 2). It was found as a result that it contained 60 weight % of cyclic oligomers of polyesters, 5 weight % of polymers, 5 weight % of constituents of the lubricating agent and 30 weight % of thermally degraded substances (tar) of the lubricating agent, oligomers and polymers. This means that a large amount of oligomers was contained.

(i) Production of POY

Immediately after melt spinning of polyethylene terephthalate, a 10% emulsion of lubricating agent was applied to the yarn by the kiss-roll method and a 12 kg cake of 76-denier, 36-filament POY was obtained by winding at the rate of 3500 m/min. The amount of lubricating agent deposited on POY was 0.30 to 0.40 weight %.

(ii) Draw-false twist texturing

Twisting system=Three-axis friction spindle (with solid ceramic disk); Speed of yarn=800 m/min; Draw ratio=1.518; Heater on twisting side=2.5 m in length with surface temperature of 220° C.; Heater on untwisting side=None; Intended number of twisting=3450 T/m.

(iii)

Evalutions of fuzz on draw-false twisted yarn, heater deposit, tackiness of white powder and static charge on the sliding yarn were made in the same way as for test Experiments Nos. 1 to 7.

In Table 2, "—" indicates that measurement was not possible because there were hardly any contaminants; "t" means that only a trace could be seen;

(A-2) is ω-methoxy polyether (Component A)

$$\begin{array}{c} CH_3 \\ \phantom{CH_3}\diagdown \\ \phantom{CH_3} C \\ \phantom{CH_3}\diagup \phantom{C} \diagdown \\ CH_3 \phantom{\diagup} \phantom{CH_3} \end{array} \begin{array}{c} CH_2O-[(PO)-(EO)]-CH_3 \\ \\ CH_2O-[(PO)-(EO)]-CH_3 \end{array}$$

with PO/EO=50/50, by block addition and MW=3000;

(A-3) is ω-methoxy polyether (Component A)

$$CH_3-\underset{\underset{CH_2O-[(PO)-(EO)]-CH_3}{|}}{\overset{\overset{CH_2O-[(PO)-(EO)]-CH_3}{|}}{C}}-CH_2O-[(PO)-(EO)]-CH_3$$

with PO/EO=60/40, by block addition and MW=3000;

(A-4) is ω-methoxy polyether (Component A)

$$\begin{array}{c} C_2H_5 \\ \phantom{C_2H_5}\diagdown \\ \phantom{C_2H_5} C \\ \phantom{C_2H_5}\diagup \phantom{C} \diagdown \\ C_4H_9 \phantom{\diagup} \phantom{C_4H_9} \end{array} \begin{array}{c} CH_2O-[(PO)-(EO)]-CH_3 \\ \\ CH_2O-[(PO)-(EO)]-CH_3 \end{array}$$

with PO/EO=70/30, by block addition and MW=3000;

(A-5) is ω-methoxy polyether $$\begin{array}{c} CH_3-[(EO)-(PO)] \\ \diagdown \\ C \\ \diagup \phantom{C} \diagdown \\ CH_3-[(EO)-(PO)] \end{array} \begin{array}{c} [(PO)-(EO)]-CH_3 \\ \\ [(PO)-(EO)]-CH_3 \end{array}$$

with PO/EO=90/10, by block addition and MW=3000;

(B-2) is polyalkylene oxide modified polysiloxane (Component B)

$$CH_3-\underset{\underset{CH_3}{|}}{\overset{\overset{CH_3}{|}}{Si}}O-(\underset{\underset{CH_3}{|}}{\overset{\overset{CH_3}{|}}{Si}}O)_{60}-(\underset{\underset{C_3H_6-O-[(EO)_{50}(PO)_{15}]-C_4H_9}{|}}{\overset{\overset{CH_3}{|}}{Si}}O)_8-\underset{\underset{CH_3}{|}}{\overset{\overset{CH_3}{|}}{Si}}-CH_3$$

where the polydimethyl siloxane part and the polyalkylene oxide modified siloxane part are random repetitions while EO and PO are block repetitions;

(A'-6) is ω-methoxy polyether $$\begin{array}{l} CH_2O-[(PO)-(EO)]-CH_3 \\ | \\ CHO-[(PO)-(EO)]-CH_3 \\ | \\ CH_2O-[(PO)-(EO)]-CH_3 \end{array}$$

with PO/EO=70/30, by block addition and MW=3000;

(A'-7) is ω-long chain alkoxy polyether $$\begin{array}{c} CH_3 \\ \phantom{CH_3}\diagdown \\ \phantom{CH_3} C \\ \phantom{CH_3}\diagup \phantom{C} \diagdown \\ CH_3 \phantom{\diagup} \phantom{CH_3} \end{array} \begin{array}{c} [(PO)-(EO)]-C_8H_{17} \\ \\ [(PO)-(EO)]-C_8H_{17} \end{array}$$

with PO/EO=70/30, by block addition and MW=3000;

(A'-8) is α-alkoxy-ω-ethoxy polyether $$C_{18}H_{35}-O-(EO)_{8.5}-(PO)_1-C_2H_5;$$

(A'-9) is polyether $$C_4H_9-O-[(PO)-(EO)]-CH_3$$

with PO/EO=50/50, by block addition and MW=2000;

(A'-10) is polyether $$CH_3CH_2-\underset{\underset{CH_2O-[(PO)-(EO)]-C_8H_{17}}{|}}{\overset{\overset{CH_2O-[(PO)-(EO)]-C_8H_{17}}{|}}{C}}-CH_2O-[(PO)-(EO)]-C_8H_{17}$$

with PO/EO=75/25, by block addition and MW=3000;

(A'-11) is polyether $$C_4H_9-O-[(PO)-(EO)]-C_4H_9$$

with PO/EO=75/25, by block addition and MW=3000; and (C-2) is lauryl dimethyl betaine.

TEST EXPERIMENTS NOS. 14 TO 17 AND COMPARISON EXPERIMENTS NOS. 25 TO 33

Lubricating agents described in Table 3 were used and experiments were performed as described for test experiments Nos. 1 to 7. The results are also shown in Table 3, which again show the superior characteristics of the compositions of the present invention.

(i) Production of POY

Immediately after melt spinning of polyamide (6,6 nylon), a 13%-emulsion of lubricating agent was applied to the yarn by the guide oiling method and an 8 kg cake of 36-denier, 7-filament POY was obtained by winding at the rate of 4000 m/min. The amount of lubricating agent deposited on POY was 0.45 to 0.55 weight % with respect to the POY.

(ii) Draw-falst twist texturing

Twisting system=Three-axis friction spindle (with hard urethane rubber disk); Speed of yarn=1100 m/min; Draw ratio=1.200; Heater on twisting side=2.5 m in length with surface temperature of 230° C.; Heater on untwisting side=None; Intended number of twisting=3000 T/m.

In Table 3, evaluations were made in the same way as in the case of test experiments Nos. 1 to 7;

(A-6) is ω-methoxy polyether

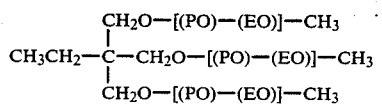

with PO/EO=85/15, by random addition and MW=3000;

(B-3) to (B-6) and (B'-6) to (B'-14) are polyalkylene oxide modified polysiloxane were l, m, a, b, $R_1$ and $R_2$ of aforementioned formula (II) are as given by Table 4; and (C-3) is lauryl dimethylamine oxide.

TABLE 1

| | Test Experiments | | | | | | | Comparison experiments | | | | | | | | | | | | | |
|---|---|---|---|---|---|---|---|---|---|---|---|---|---|---|---|---|---|---|---|---|---|
| | 1 | 2 | 3 | 4 | 5 | 6 | 7 | 1 | 2 | 3 | 4 | 5 | 6 | 7 | 8 | 9 | 10 | 11 | 12 | 13 | 14 |
| (A-1) | 96.8 | 96 | 95 | 91 | 87 | 55 | 81 | 91 | 91 | 91 | 91 | 91 | | | | 31 | 31 | | 97 | 36 | 31 |
| (B-1) | 0.2 | 1 | 2 | 6 | 10 | 6 | 6 | | | | | | 6 | 6 | 6 | | | 6 | | 6 | 66 |
| (A'-1) | | | | | | | | | | | | | 91 | | | | | | | | |
| (A'-2) | | | | | | | | | | | | | 91 | | | | | | | | |
| (A'-3) | | | | | | | | | | | | | | | 91 | | | | | | |
| (A'-4) | | | | | 36 | | | | | | | | | | | | | | 91 | | 55 | |
| (A'-5) | | | | | | 10 | | | | | | | | | | | | | | | |
| (B'-1) | | | | | | | | 6 | | | | | | | | 66 | | | | | |
| (B'-2) | | | | | | | | | 6 | | | | | | | | 66 | | | | |
| (B'-3) | | | | | | | | | | 6 | | | | | | | | | | | |
| (B'-4) | | | | | | | | | | | 6 | | | | | | | | | | |
| (B'-5) | | | | | | | | | | | | 6 | | | | | | | | | |
| (C-1) | 3 | 3 | 3 | 3 | 3 | 3 | 3 | 3 | 3 | 3 | 3 | 3 | 3 | 3 | 3 | 3 | 3 | 3 | 3 | 3 | 3 |
| Fuzz | O | O | O | O | O | O | O | | | | | | | X | | X | X | | | | X |
| Heater | O | O | O | O | O | O | O | X | X | X | X | X | O | X | X | X | X | O | X | | X |
| Powder | O | O | O | O | O | O | O | O | O | O | O | O | | O | | X | X | X | | X | X |
| Charge | O | O | O | O | O | O | O | | | | | | O | O | O | X | X | O | O | O | O |

TABLE 2

| | Test Exp't | | | | | | Comparison Exp't | | | | | | | | | | |
|---|---|---|---|---|---|---|---|---|---|---|---|---|---|---|---|---|---|
| | 8 | 9 | 10 | 11 | 12 | 13 | 15 | 16 | 17 | 18 | 19 | 20 | 21 | 22 | 23 | 24 |
| (A-2) | 97 | | | | *2 | 89 | *3 | 92 | *4 | 84 | | | | | | |
| (A-3) | | 97 | | | | | | | | | | | | | | |
| (A-4) | | | 97 | | | | | | | | | | | | | |
| (A-5) | | | | 97 | | | | | | | | | | | | |
| (B-2) | 2 | 2 | 2 | 2 | .1 | 10 | 2 | 2 | *5 | 15 | 2 | 2 | 2 | 2 | 2 | 2 |
| (A'-6) | | | | | | | | | | | 97 | | | | | |
| (A'-7) | | | | | | | | | | | | 97 | | | | |
| (A'-8) | | | | | | | | | | | | | 97 | | | |
| (A'-9) | | | | | | | | | | | | | | 97 | | |
| (A'-10) | | | | | | | | | | | | | | | 97 | |
| (A'-11) | | | | | | | | | | | | | | | | 97 |
| (C-2) | 1 | 1 | 1 | 1 | 1 | 1 | *6 | 6 | 1 | 1 | 1 | 1 | 1 | 1 | 1 | 1 |
| Fuzz | O | O | O | O | O | O | Δ | Δ | Δ | X | X | X | X | X | O | X |
| Heater | O | O | O | O | O | O | X | X | X | X | X | X | X | X | X | X |
| Oligomer | — | — | — | — | — | — | 12 | 60 | t | t | t | t | 15 | t | t | t |
| Powder | O | O | O | O | O | O | Δ | O | X | O | O | O | O | Δ | O | O |
| Charge | O | O | O | O | O | X | O | O | O | O | O | O | O | O | O | O | where *2 = 98.9,
*3 = 97.95,
*4 = 98.96,
*5 = 0.04 and
*6 = 0.05.

TABLE 3

| | Test Exp't | | | | Comparison Exp't | | | | | | | | |
|---|---|---|---|---|---|---|---|---|---|---|---|---|---|
| | 14 | 15 | 16 | 17 | 25 | 26 | 27 | 28 | 29 | 30 | 31 | 32 | 33 |
| (A-6) | 97 | 97 | 97 | 97 | 97 | 97 | 97 | 97 | 97 | 97 | 97 | 97 | 97 |
| (B-3) | 1 | | | | | | | | | | | | |
| (B-4) | | 1 | | | | | | | | | | | |
| (B-5) | | | 1 | | | | | | | | | | |
| (B-6) | | | | 1 | | | | | | | | | |
| (B'-6) | | | | | 1 | | | | | | | | |
| (B'-7) | | | | | | 1 | | | | | | | |
| (B'-8) | | | | | | | 1 | | | | | | |
| (B'-9) | | | | | | | | 1 | | | | | |
| (B'-10) | | | | | | | | | 1 | | | | |
| (B'-11) | | | | | | | | | | 1 | | | |
| (B'-12) | | | | | | | | | | | 1 | | |
| (B'-13) | | | | | | | | | | | | 1 | |
| (B'-14) | | | | | | | | | | | | | 1 |
| (C-3) | 2 | 2 | 2 | 2 | 2 | 2 | 2 | 2 | 2 | 2 | 2 | 2 | 2 |
| Fuzz | O | O | O | O | X | X | X | X | X | X | X | X | X |
| Heater | O | O | O | O | X | X | X | X | X | X | X | X | X |
| Powder | O | O | O | O | O | O | O | O | O | O | O | O | O |
| Charge | O | O | O | O | O | O | O | O | O | O | O | O | O |

TABLE 4

| | l | m | a | b | $R_1$ | $R_2$ | Repetition of l and m | Repetition of a and b |
|---|---|---|---|---|---|---|---|---|
| (B-3) | 20 | 4 | 5 | 15 | $C_3H_6$ | H | Random | Random |
| (B-4) | 30 | 3 | 30 | 15 | $C_3H_6$ | $CH_3$ | Random | Random |
| (B-5) | 50 | 5 | 15 | 15 | $C_4H_8$ | $C_4H_9$ | Block | Block |
| (B-6) | 90 | 2 | 10 | 25 | $C_3H_6$ | *7 | Random | Random |
| (B'-6) | 20 | 30 | 5 | 15 | $C_3H_6$ | H | Random | Random |
| (B'-7) | 30 | 3 | 80 | 40 | $C_3H_6$ | $CH_3$ | Random | Random |
| (B'-8) | 4 | 5 | 15 | 15 | $C_4H_8$ | H | Block | Block |
| (B'-9) | 120 | 2 | 10 | 25 | $C_3H_6$ | H | Random | Random |
| (B'-10) | 20 | 30 | 2 | 3 | $C_3H_6$ | $CH_3$ | Random | Random |
| (B'-11) | 0 | 9 | 20 | 20 | $C_3H_6$ | H | — | Random |
| (B'-12) | 20 | 2 | 20 | 0 | $C_3H_6$ | H | Random | — |
| (B'-13) | 20 | 2 | 20 | 4 | $C_3H_6$ | H | Random | Random |

TABLE 4-continued

| | l | m | a | b | $R_1$ | $R_2$ | Repetition of l and m | Repetition of a and b |
|---|---|---|---|---|---|---|---|---|
| (B'-14) | 20 | | 2 | 3 | 20 $C_3H_6$ | H | Random | Random | where *7 = 

What is claimed is:

1. A spin finish composition adapted to be applied to polyester or polyamide yarns for ultra-high speed texturing with yarn speed 600 m/min or greater, said composition comprising a base oil of polyether compounds which are ω-methoxypoly(oxyethylene/oxypropylene)ether derivatives synthesized from an alcohol shown by

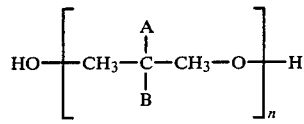
(I)

(where A and B are independently alkyl group with 1 to 4 carbon atoms or hydroxy methyl group and n is 1 or 2), 1,2-propylene oxide and a methylator, the average molecular weight of said polyether compounds being 1500 to 6000 and the average weight ratio of oxyethylene/oxypropylene thereof being 5-50/95-50; and 0.05 to 10 weight % of polyalkylene oxide modified polysiloxane of average molecular weight no less than 2500 shown by

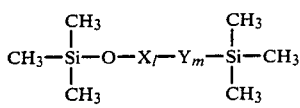
(II)

(where X is

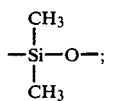

l is an integer in the range of 20 to 100; and Y is

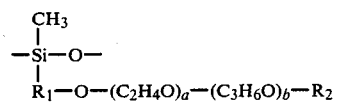

wherein $R_1$ is alkylene group with 3 to 4 carbon atoms, $R_2$ is hydrogen, alkyl group with 1 to 8 carbon atoms or acyl group with 2 to 8 carbon atoms; a and b are integers satisfying the conditions $15 \leq a+b \leq 80$ and $2/8 \leq b/a \leq 8/2$; the polydimethyl siloxane part shown by X and the polyalkylene oxide modified siloxane part shown by Y may be repeated either by block repetition or by random repetition; and the repetition parts marked by a and b may be either by block repetition or by random repetition).

* * * * *